Feb. 22, 1966   E. LONG   3,236,738
NUCLEAR REACTOR, HEAT EXCHANGER AND SERVICING ARRANGEMENT
WITH MEANS TO COOL SERVICING MACHINE
Filed Jan. 29, 1962   3 Sheets-Sheet 1

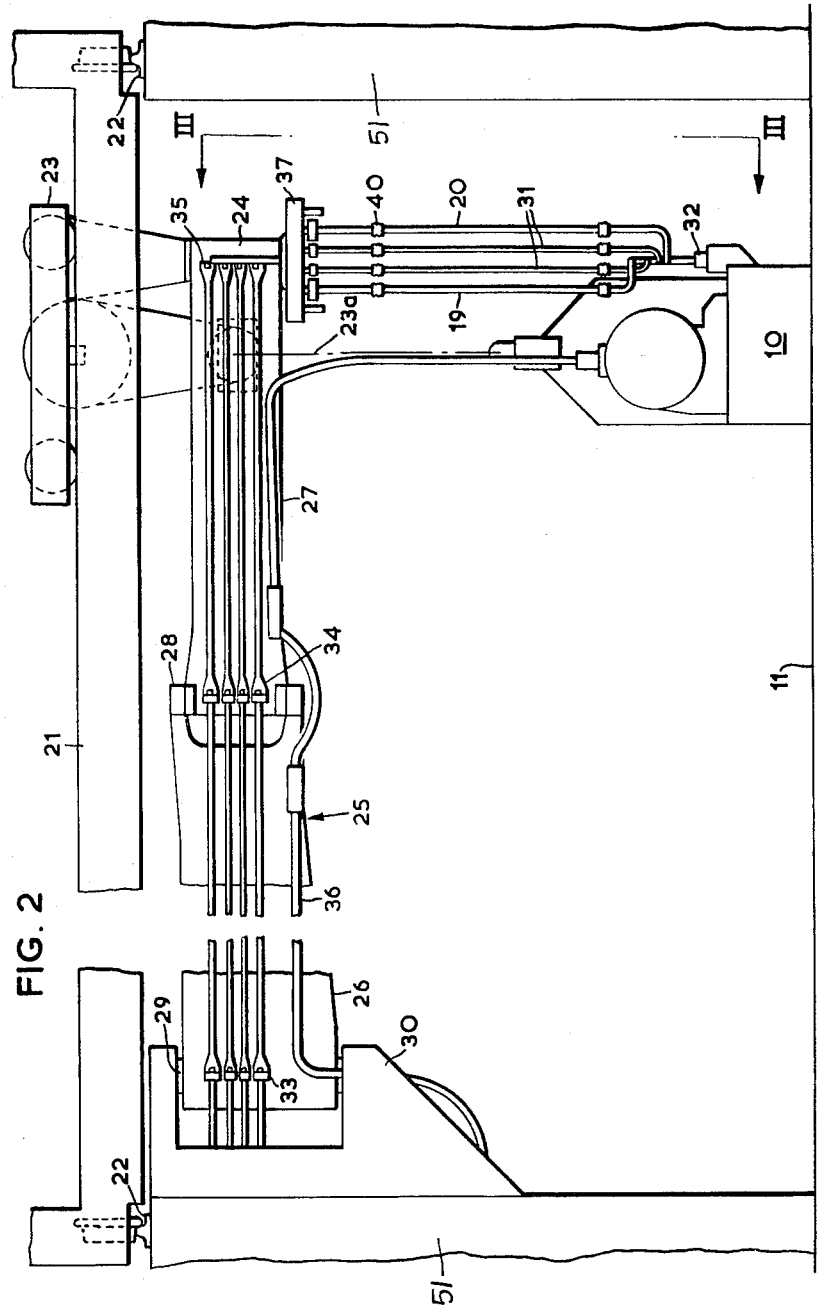

3,236,738
NUCLEAR REACTOR, HEAT EXCHANGER AND SERVICING ARRANGEMENT WITH MEANS TO COOL SERVICING MACHINE
Everett Long, Whetstone, England, assignor to The English Electric Company Limited, London, England, a British company
Filed Jan. 29, 1962, Ser. No. 169,400
Claims priority, application Great Britain, Jan. 31, 1961, 3,630/61
2 Claims. (Cl. 176—30)

This invention relates to nuclear reactors.

According to the invention, in a servicing system for a nuclear reactor including mobile servicing means for operation over the pile cap of the reactor, conduit means are supported by overhead boom means between a fixed location on the reactor and the servicing means, one end of the boom means being pivoted about a fixed axis and the other end being arranged for horizontal movement with the servicing means.

According to a preferred feature of the invention, the conduit means include at least one pipe connected to the reactor cooling circuit and to the interior of the servicing means whereby to allow coolant to flow between the reactor cooling circuit and the servicing means.

A servicing system for a gas-cooled nuclear reactor in a preferred form, incorporating features of the invention, will now be described with reference to the accompanying drawings of which:

FIG. 2 is an elevation showing part of the system;

Figure 1:
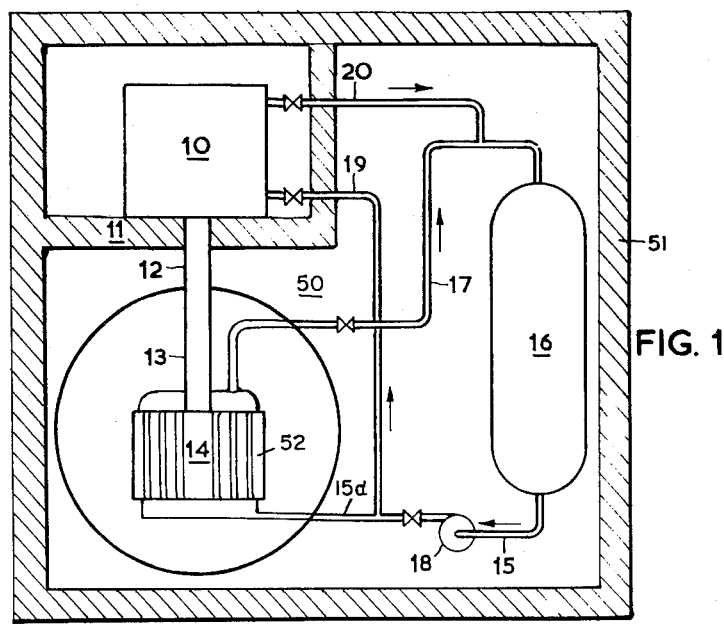
FIG. 1 is a schematic diagram showing the connections of cooling-gas circuits associated with the system.
Figure 3:
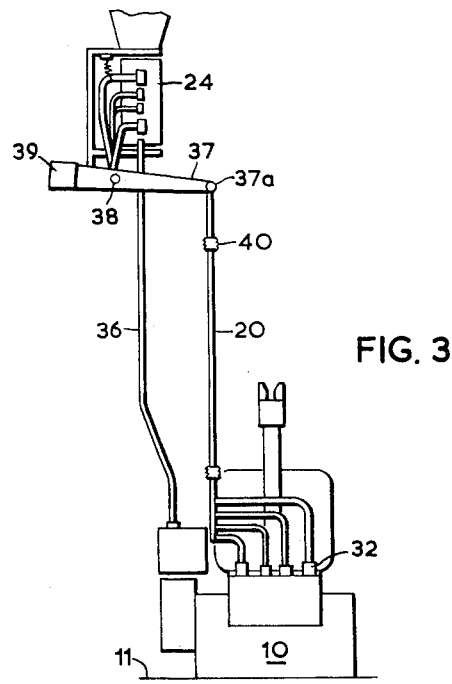
FIG. 3 is a part-elevation in the direction III—III of FIG. 2.

Referring now to the drawings, a fuelling machine 10 operates over the pile cap 11 of a nuclear power reactor 50 housed in a building 51 to remove spent elements from, and load new elements into standpipes 12 of the reactor. Each standpipe 12 leads through a charge chute (shown diagrammatically at 13 in FIG. 1) to a number of fuel channels 52 in the reactor core 14. The reactor cooling circuit, shown in FIG. 1, includes pipes 15 and 15a which lead coolant gas from a main heat exchanger 16 to the lower ends of the fuel channels 52 in the reactor core 14 and a pipe 17 returning the gas from the upper ends of the fuel channels 52 to the heat exchanger 16. The gas is circulated by gas pressurizing means comprising a main circulating blower 18 which is situated between the pipes 15 and 15a; the pipes 15a and 17 constitute gas inlet and outlet means respectively for the reactor core.

During loading or unloading of fuel elements through a standpipe 12 it is desirable to maintain the standpipe, together with the charge chute 13 and those parts of the fuelling machine in communication with the standpipe and charge chute, at substantially the same pressure and temperature as the reactor core 14. For this purpose a conduit or pipe 19 is connected between pipe 15a and the fuelling machine 10. Gas passes from pipe 15a, through the pipe 19 and the fuelling machine, whence most of it returns through a further conduit or pipe 20 to the outlet pipe 17 in the reactor cooling system. The remainder of the gas from the pipe 15a passes, when the fuelling machine is in operation, through the charge chute 13 into the core. The directions of gas flow in the system are generally as indicated by the arrows in FIG. 1. It can be seen that since the pipes 19 and 20 are connected in the cooling circuit on opposite sides of the blower 18, they constitute a means of bleeding gas from the reactor cooling circuit and passing it through the fuelling machine 10 under pressure, substantially in parallel with the cooling circuit of the reactor core.

The fuelling machine 10 is moved from one position to another in the pile cap area by means of an overhead crane 21 running on rails 22 and having a crane trolley 23; the fuelling machine is suspended from the crane trolley 23 by means of tackle generally indicated at 23a. Attached to the crane trolley 23 through a pivot connection 24 is one end of a braced boom generally indicated at 25, comprising two beam members 26 and 27 hinged together as shown at 28, the end of the beam member 26 remote from the crane trolley being mounted through a pivot 29 on a pedestal 30 situated on the wall of the reactor building 51. The boom 25 is cantilevered from the pivot 29. The pipes 19 and 20, together with other pipes 31 carrying services to the fuelling machine, are connected by detachable connections 32 to the fuelling machine 10 and are mounted on and secured to the boom 25. The pipes have flexible joints 33, 34 and 35 which are coaxial with the pivot connections 29, 28 and 24 respectively. Electric cables 36, leading to the fuelling machine, are also mounted on the boom 25.

In order to move the vertical portions of the pipes 19, 20 and 31 up and down with the fuelling machine 10 when the latter is lifted and lowered by the crane, an arm 37 is pivoted about a horizontal axis 38 on the outer end of the beam member 27, the vertical portions of the pipes being suspended from one end 37a of arm 37 and a counterweight 39 being provided at the other end of the arm. Joints 40 are provided on the vertical portions of the pipes 19, 20 and 31, and the pipes are flexible between the joints 35 and 40 to allow for movement of the arm 37 about the axis 38.

Figure 4:
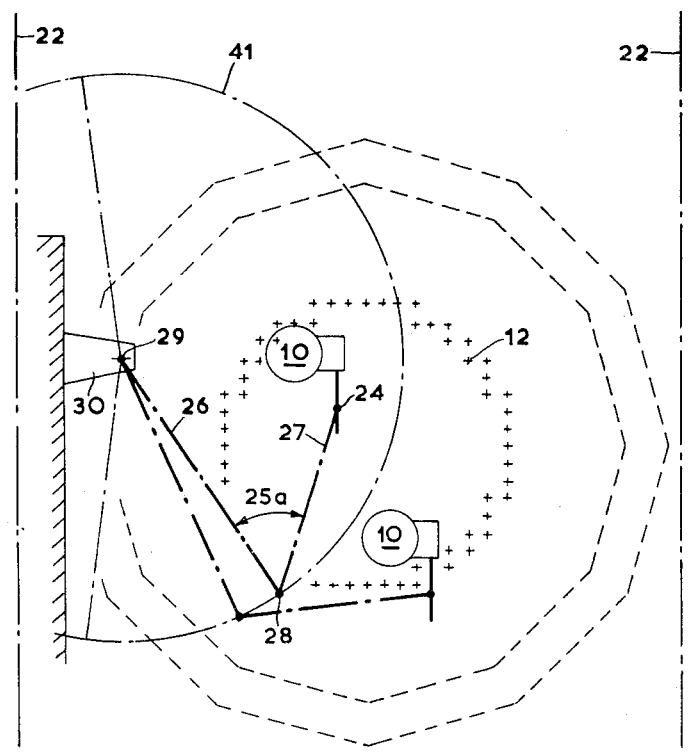
FIG. 4 is a diagrammatic plan view showing a general arrangement of parts of the system.

Referring now to FIG. 4, the beam members 26 and 27 are so arranged that the angle between them (indicated at 25a) can be varied between about 40° and 165°; the member 26 is capable of swinging through a substantial angle about the pivot 29, the locus of the hinged joint 28 being indicated by the chain-dotted curve 41 in the figure. The figure shows the machine 10 and the boom 25 in two possible positions.

In operation, to move the fuelling machine 10 from one position to another, the machine is lifted clear of the pile cap 11 by the crane, placed over its new position and lowered onto the pile cap. During this moving operation, the boom 25 automatically adjusts its shape in the horizontal plane, freely turning about the pivots 24 and 29 and at the hinged joint 28. During lifting the end 37a of arm 37 lifts under the influence of the weight 39 so as to keep the vertical portions of pipes 19, 20 and 31 rigid.

The pipe connections 32 are made so that they can be disconnected from the fuelling machine when required and attached to a reactor servicing machine (not shown) other than that used for fuelling.

What I claim as my invention and desire to secure by Letters Patent is:

1. A nuclear reactor including a reactor core having fuel channels therein, a heat exchanger, first conduit means connected between the heat exchanger and one end of the fuel channels, coolant pressurising means in said first conduit means, second conduit means connected between the other end of the fuel channels and the heat exchanger, mobile servicing means movable over the reactor core and having coolant passages therein, third conduit means connected between said first conduit means and said coolant passages in the servicing machine, and fourth conduit means connected between said coolant passages in the servicing machine and said second conduit means, so that said pressurising means can cause reactor coolant gas to pass through both the fuel channels and the said coolant passages in the servicing machine simultaneously.

2. A nuclear reactor including a reactor core having reactor coolant passages therein, a heat exchanger, first conduit means connected between the heat exchanger and one end of the reactor coolant passages, coolant pressurising means in said first conduit means, second conduit means connected between the other end of the reactor coolant passages and the heat exchanger, mobile servicing means movable over the reactor core and having coolant passages therein, third conduit means connected between said first conduit means and said coolant passages in the servicing machine, and fourth conduit means connected between said coolant passages in the servicing machine and said second conduit means, so that said pressurising means can cause reactor coolant gas to pass through both the reactor coolant passages and the said coolant passages in the servicing machine simultaneously.

References Cited by the Examiner

UNITED STATES PATENTS

| 2,326,207 | 8/1943 | Eddy | 248—325 |
| 2,659,827 | 11/1953 | Scag et al. | 248—326 X |
| 2,905,338 | 9/1959 | Koch. | |
| 3,051,642 | 8/1962 | Dent | 176—30 |
| 3,090,741 | 5/1963 | Fawcett | 176—30 |

FOREIGN PATENTS

| 1,247,096 | 10/1960 | France. |
| 859,799 | 1/1961 | Great Britain. |

CARL D. QUARFORTH, *Primary Examiner.*

REUBEN EPSTEIN, *Examiner.*